UNITED STATES PATENT OFFICE 2,496,669

COPOLYMERIZATION OF THIOPHENE WITH STYRENE

Jacob R. Meadow, Lexington, Ky., and Arlie A. O'Kelly, Woodbury, N. J., assignors to Socony-Vacuum Oil Company, Incorporated, a corporation of New York No Drawing. Application December 4, 1948, Serial No. 63,635

12 Claims. (Cl. 260—79.7)

This invention relates to the copolymerization of thiophene with styrene, and is more particularly concerned with the production of useful synthetic resins through the catalytic copolymerization of thiophene with styrene.

It is well known in the art to effect a union between molecules of an unsaturated compound to produce materials called homopolymers, the molecular weights of which are even multiples of the molecular weight of the original compound. The operation is called homopolymerization and the conditions of temperature, pressure, etc., are called homopolymerizing conditions. Under suitable conditions, the union may take place also between or among molecules of two or more unsaturated compounds to produce products that represent additions of the two or more compounds. The materials thus obtained are referred to as copolymers, as distinguished from the materials obtained when unsaturated compounds condense with themselves, and the operation is called copolymerization.

As is well known to those familiar with the art, homopolymerization and copolymerization reactions may be carried out in the presence of substances or of mixtures of substances that facilitate the homopolymerization or copolymerization reaction. These substances are referred to as homopolymerization catalysts or copolymerization catalysts, depending upon the type of reaction they catalyze. Several substances have been proposed as homopolymerization and copolymerization catalysts and among the most widely used are phosphoric acid, sulfuric acid, aluminum chloride, stannic chloride, and boron fluoride.

Hydrofluoric acid has been used to polymerize thiophene, [Fredenhagen, Zeit. Physik. Chem., A-164, 190 (1933)]; and olefinic hydrocarbons [Grosse and Linn, (Jl. Org. Chem., 3, 26 (1938))] In an unpublished dissertation at Pennsylvania State College, Hughes has suggested the use of hydrofluoric acid to polymerize acetaldehyde, furfural, and acetone.

Homopolymerization and copolymerization reactions form the bases of many processes for manufacturing some of the most important, from a commercial standpoint, synthetic resins. The polymerization of styrene to produce polystyrene, a well-known synthetic resin, is a good example. These synthetic resins may be liquids, semi-solids or solids, depending upon the extent of polymerization or, to use the terminology of the art, the degree of resinification; however, they have the common properties of being amorphous, of having no tendency to crystallize, and of having somewhat complex molecular structure.

It has now been discovered that thiophene can be copolymerized with styrene. It has been found that valuable synthetic resins may be prepared by copolymerizing thiophene with styrene in the presence of hydrogen fluoride.

Accordingly, it is an object of the present invention to provide a method of effecting the copolymerization of thiophene with styrene. Another object is to provide a process for preparing valuable synthetic resins. A more specific object is to provide a process for catalytically copolymerizing thiophene with styrene. A very important object is to afford a process capable of carrying out the above objects by effecting the copolymerization of thiophene with styrene in the presence of hydrogen fluoride. Other objects and advantages of the present invention will become apparent to those skilled in the art from the following description.

Broadly stated, this invention provides a process for manufacturing valuable synthetic resins, which comprises reacting thiophene with styrene in the presence of hydrogen fluoride.

As a result of the copolymerization of thiophene with styrene, in accordance with the process of the present invention, high-molecular weight, rubber-like copolymers are obtained. The degree of copolymerization will, of course, determine the molecular weight of the product, it being obvious that the degree of copolymerization will establish the stage of resinification achieved and thus determine the solubility (in organic solvents) characteristics of the copolymers.

If the structural formula of thiophene is written thus:

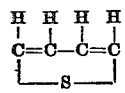

it will be observed that the basic structure is generally similar to that of butadiene and isoprene:

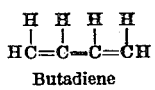 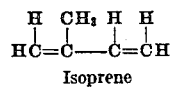

Butadiene    Isoprene the main difference being the loss of two end-hydrogen atoms and the substitution of a sulfur bridge causing ring closure in the thiophene molecule. When considered in this manner, these compounds have in common the characteristic conjugated structure: C=C—C=C, of polymerizable substances. The conjugated system, of course, is latent in the structure of thiophene; however, the presence of even relatively small amounts of hydrogen fluoride, a strong polymerization catalyst, causes an apparently instantaneous polymerization. The reaction is so rapid that it has been found necessary to use either diluted hydrofluoric acid, and/or to use suitable inert diluents with thiophene.

In carrying out the process of the present invention, hydrogen fluoride preferably is used in amounts of at least about one per cent and up to about 25 per cent, based on the weight of thiophene in the charge. However, in accordance with the foregoing, hydrogen fluoride is employed in conjunction with a thiophene diluent, and when no thiophene diluent is used, aqueous solutions of hydrofluoric acid in which hydrogen fluoride is present in concentrations varying between 60% and 98% are employed.

The inert diluents for thiophene are essentially well known organic solvents, and may be pure substances or mixtures of substances, provided that they possess the required characteristics. These are primarily an inert nature under the conditions of the copolymerization reaction; and, secondarily, amenability to easy separation and recovery from the reaction product. Isooctane, purified gasoline, cyclohexane and mixtures thereof have been found to be very effective thiophene diluents of this type and are mentioned by way of non-limiting examples. The amounts of thiophene diluents used in this process may vary between wide limits; ordinarily, a solution of thiophene in a thiophene diluent or solvent containing between 5% and 50% by volume of thiophene is used.

The relative amounts of thiophene and of styrene to be used in the charge of this process may be changed at will to produce synthetic resins having a wide range of physical properties. In practice, a charge containing thiophene and styrene in a molecular ratio of 1–3:3–1, respectively, is employed. Ordinarily, equal weights of the two reactants are used; however, it must be understood that the proportions may be varied within wide limits.

In the copolymerization of thiophene with styrene, in the presence of hydrogen fluoride, the effect of the catalyst is much more rapid on the thiophene than on the styrene. Accordingly, styrene should be activated somewhat by the addition of well-known polymerization catalysts for styrene, for example, anhydrous stannic chloride. It has been found that the addition of small amounts of well known styrene polymerization catalysts, on the order of fractions of one per cent, for example, 0.05–0.9 per cent, based on the weight of styrene in the charge, is sufficient to cause the polymerization of styrene to proceed at a rate substantially equal to that of the hydrogen fluoride-catalyzed thiophene. Under these conditions, the product obtained is more homogeneous.

The copolymerization conditions of temperature, pressure and time may be varied within wide limits; it being understood, however, that they are more or less interdependent. Therefore, when one is arbitrarily fixed, the limits within which the others may be varied are somewhat restricted. In any particular case, the most desirable magnitude of temperature, pressure and time of reaction for achieving a desired stage of resinification can be readily ascertained by one skilled in the art, the limits within which these variables may vary being as follows: The copolymerization of thiophene with styrene is carried out at temperatures varying between 0° C. and 100° C., and at pressures varying between 5 pounds per square inch and 100 pounds per square inch, gauge. As expected, the reaction time depends upon the temperature and, to a certain extent, upon the pressure. Ordinarily, a reaction time varying between 10 minutes and 2 hours is sufficient to achieve some stage of resinification.

The copolymerization may be effected in several ways. For example, the reaction may be commenced with the homopolymerization of the styrene with subsequent addition of thiophene to the styrene homopolymer and thereafter causing copolymerization of the thiophene with styrene or styrene homopolymer, in the presence of an aqueous solution of hydrogen fluoride; or, a mixture of styrene with a solution of thiophene in a thiophene solvent, containing a small amount of a styrene polymerization catalyst, may be stirred with hydrogen fluoride. The hydrogen fluoride catalyst can be added to the reaction mixture over a period of time corresponding to the reaction time, if desired.

The resilient rubber-like masses obtained in accordance with this invention can be worked, pressed or extruded into any desired shape or form. They can be cured under pressure and heat into hard, thermosetting types of synthetic resins. These find a wide variety of useful applications in industry similar to those of the phenol-formaldehyde types of synthetic resins.

*Example*

5 grams of styrene were allowed to homopolymerize using a trace (0.1% by weight) of stannic chloride, until a clear, viscous liquid was obtained. 5 grams of thiophene were dissolved in the viscous liquid to produce a homogeneous mass and a 96% aqueous solution of hydrogen fluoride (96 parts of hydrofluoric acid and 4 parts of water) was added dropwise to the mass while the latter was stirred continually and occasionally heated, until about 5%, based on the weight of thiophene, of hydrofluoric acid had been added. A solid, homogeneous, sticky mass was obtained which upon analysis contained 10.7% of sulfur.

This application is a continuation-in-part of application Serial Number 519,914, filed January 27, 1944, and now abandoned.

The present invention may be embodied in other specific forms without departing from the spirit or essential attributes thereof, and it is therefore desired that the present embodiments be considered in all respects as illustrative and not restrictive, reference beind had to the appended claims rather than to the foregoing description to indicate the scope of the invention.

What is claimed is:

1. The process of manufacturing synthetic resins, which comprises contacting thiophene with styrene, in amounts falling within the range of mole ratios of styrene to thiophene of 1–3:3–1, respectively, in the presence of hydrogen fluoride in amounts falling within the range varying between 1% and 25% based on the weight of thiophene.

2. The process of manufacturing synthetic resins, which comprises contacting a solution of thiophene in an inert thiophene solvent containing between 5% and 50% by volume of thiophene, with styrene in an amount falling within the range of mole ratios of styrene to thiophene in said solution of 1-3:3-1, respectively, in the presence of hydrogen fluoride in amounts falling within the range varying between 1% and 25% based on the weight of thiophene in said solution.

3. The process of manufacturing synthetic resins, which comprises contacting thiophene with styrene, in amounts falling within the range of mole ratios of styrene to thiophene of 1-3:3-1, respectively, in the presence of an aqueous solution of hydrogen fluoride containing in excess of 60% hydrogen fluoride and in amounts to produce a concentration of hydrogen fluoride falling within the range varying between 1% and 25% based on the weight of thiophene.

4. The process of manufacturing synthetic resins, which comprises contacting a solution of thiophene in an inert thiophene solvent containing between 5% and 50% by volume of thiophene, with styrene in an amount falling within the range of mole ratios of styrene to thiophene in said solution of 1-3:3-1, respectively, in the presence of an aqueous solution of hydrogen fluoride containing in excess of 60% hydrogen fluoride and in amounts to produce a concentration of hydrogen fluoride falling within the range varying between 1% and 25% based on the weight of thiophene in said solution.

5. The process of manufacturing synthetic resins, which comprises contacting thiophene with styrene in an amount falling within the range of mole ratios of styrene to thiophene of 1-3:3-1, respectively, and containing between 0.05% and 0.9% by weight of a styrene polymerization catalyst, in the presence of hydrogen fluoride in amounts falling within the range varying between 1% and 25% based on the weight of thiophene.

6. The process of manufacturing synthetic resins, which comprises contacting a solution of thiophene in an inert thiophene solvent containing between 5% and 50% by volume of thiophene, with styrene in an amount falling within the range of mole ratios of styrene to thiophene in said solution of 1-3:3-1, respectively, and containing between 0.05% and 0.9% by weight of a styrene polymerization catalyst, in the presence of hydrogen fluoride in amounts falling within the range varying between 1% and 25% based on the weight of thiophene in said solution.

7. The process of manufacturing synthetic resins, which comprises contacting thiophene with styrene in an amount falling within the range of mole ratios of styrene to thiophene of 1-3:3-1, respectively, and containing between 0.05% and 0.9% by weight of a styrene polymerization catalyst, in the presence of an aqueous solution of hydrogen fluoride containing in excess of 60% hydrogen fluoride and in amounts to produce a concentration of hydrogen fluoride falling within the range varying between 1% and 25% based on the weight of thiophene.

8. The process of manufacturing synthetic resins, which comprises contacting a solution of thiophene in an inert thiophene solvent containing between 5% and 50% by volume of thiophene, with styrene in an amount falling within the range of mole ratios of styrene to thiophene in said solution of 1-3:3-1, respectively, and containing between 0.05% and 0.9% by weight of a styrene polymerization catalyst, in the presence of an aqueous solution of hydrogen fluoride containing in excess of 60% hydrogen fluoride and in amounts to produce a concentration of hydrogen fluoride falling within the range varying between 1% and 25% based on the weight of thiophene in said solution.

9. The process of manufacturing synthetic resins, which comprises treating styrene to yield a mixture of styrene and styrene polymer, dissolving thiophene in an amount falling within the range of mole ratios of styrene to thiophene of 1-3:3-1, respectively, in said mixture to yield a homogeneous mass, and adding to said homogeneous mass an aqueous solution of hydrogen fluoride containing in excess of 60% hydrogen fluoride and in amounts to produce a concentration of hydrogen fluoride falling within the range varying between 1% and 25% based on the weight of thiophene.

10. The process of manufacturing synthetic resins, which comprises treating styrene to yield a mixture of styrene and styrene polymer, dissolving thiophene in an amount substantially equal in weight to that of the styrene in said mixture to yield a homogeneous mass, and adding to said homogeneous mass an aqueous solution of hydrogen fluoride containing in excess of 60% hydrogen fluoride and in amounts to produce a concentration of hydrogen fluoride falling within the range varying between 1% and 25% based on the weight of thiophene.

11. A synthetic resin obtained by the process which comprises contacting thiophene with styrene, in amounts falling within the range of mole ratios of styrene to thiophene of 1-3:3-1, respectively, in the presence of hydrogen fluoride in amounts falling within the range varying between 1% and 25% based on the weight of thiophene.

12. A synthetic resin obtained by the process which comprises treating styrene to yield a mixture of styrene and styrene polymer, dissolving thiophene in an amount falling within the range of mole ratios of styrene to thiophene of 1-3:3-1, respectively, in said mixture to yield a homogeneous mass, and adding to said homogeneous mass an aqueous solution of hydrogen fluoride containing in excess of 60% hydrogen fluoride and in amounts to produce a concentration of hydrogen fluoride falling within the range varying between 1% and 25% based on the weight of thiophene.

JACOB R. MEADOW.
ARLIE A. O'KELLY.

No references cited.